US012099553B2

(12) United States Patent
Madden

(10) Patent No.: US 12,099,553 B2
(45) Date of Patent: Sep. 24, 2024

(54) FLAP DETECTION IN A COMPUTER SYSTEM

(71) Applicant: Salesforce, Inc., San Francisco, CA (US)

(72) Inventor: John Madden, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 180 days.

(21) Appl. No.: 17/470,477

(22) Filed: Sep. 9, 2021

(65) Prior Publication Data

US 2023/0074799 A1  Mar. 9, 2023

(51) Int. Cl.
G06F 16/903   (2019.01)
G06F 11/07    (2006.01)
G06F 16/25    (2019.01)
G06F 16/9035  (2019.01)

(52) U.S. Cl.
CPC .... G06F 16/90335 (2019.01); G06F 11/0751 (2013.01); G06F 11/0793 (2013.01); G06F 16/252 (2019.01); G06F 16/9035 (2019.01)

(58) Field of Classification Search
CPC ........... G06F 16/90335; G06F 16/9035; G06F 16/903; G06F 16/252
See application file for complete search history.

(56) References Cited

U.S. PATENT DOCUMENTS

| | | | |
|---|---|---|---|
| 7,730,478 B2 | 6/2010 | Weissman | |
| 9,804,726 B1 * | 10/2017 | Joos | G06T 11/206 |
| 10,089,476 B1 * | 10/2018 | Roth | G06Q 20/14 |
| 10,133,775 B1 * | 11/2018 | Ramalingam | G06F 16/24542 |
| 10,541,889 B1 * | 1/2020 | Mishra | H04L 43/08 |
| 10,831,592 B1 * | 11/2020 | Puttur | G06F 11/3419 |
| 10,887,281 B2 | 1/2021 | Madden et al. | |
| 10,887,450 B1 * | 1/2021 | Wilson | H04M 3/36 |
| 10,999,176 B1 * | 5/2021 | Levy | H04L 43/106 |
| 2003/0073917 A1 * | 4/2003 | Echauz | A61B 5/4094 600/510 |
| 2003/0182149 A1 * | 9/2003 | Matsui | G06Q 30/0641 705/26.1 |
| 2013/0172759 A1 * | 7/2013 | Melker | A61B 5/682 600/476 |
| 2015/0071095 A1 * | 3/2015 | Phan Huy | H04L 27/261 370/252 |

(Continued)

Primary Examiner — Vaishali Shah
(74) Attorney, Agent, or Firm — Nicholson, De Vos, Webster & Elliott, LLP

(57) ABSTRACT

A method by one or more electronic devices to detect flapping in a computer system. The method includes obtaining a plurality of metric values indicating a state of the computer system at various times within a time window, determining a combined length of lines connecting time-wise consecutive points representing the plurality of metric values in a cartesian coordinate system, wherein a first axis of the cartesian coordinate system represents time and a second axis of the cartesian coordinate system represents a metric associated with the plurality of metric values, determining a baseline length based on a maximum metric value within the time window, a minimum metric value within the time window, and a length of the time window, and determining whether the computer system flapped during the time window based on a result of comparing the combined length to the baseline length.

17 Claims, 6 Drawing Sheets

(56) References Cited

U.S. PATENT DOCUMENTS

| | | | |
|---|---|---|---|
| 2015/0324388 A1* | 11/2015 | Benke | G06F 16/184 |
| | | | 707/610 |
| 2017/0053007 A1* | 2/2017 | Marascu | H04L 63/1425 |
| 2021/0281591 A1* | 9/2021 | Furtak | H04L 63/1425 |
| 2021/0336871 A1* | 10/2021 | Vasseur | H04L 47/805 |
| 2022/0109634 A1* | 4/2022 | Backhus | H04L 47/125 |
| 2022/0355112 A1* | 11/2022 | Weiss | A61N 1/36139 |

* cited by examiner

Normal: frequent fluctuations but short combined length

Normal: high metric values with little fluctuation

Normal: trending increase in metric values

Normal: a plateau and large spike in metric values (e.g., computer system warming up)

Abnormal: frequent and large fluctuations resulting in long combined length

FLAP DETECTION IN A COMPUTER SYSTEM

TECHNICAL FIELD

One or more implementations relate to the field of monitoring computer systems, and more specifically, to detecting flapping in a computer system.

BACKGROUND

In many computer systems, periods of high usage may cause resource shortages that produce backpressure on other computer systems, causing a ripple effect in neighboring computer systems. An example is a web application that maintains a pool of database connections to a database server, where the number of database connections in the pool increases and decreases in size over time in response to load. In cases of a sudden database resource shortage the number of database connections in the pool may suddenly spike and then return to normal. This may have negative consequences on the end-user experience (e.g., inconsistent response times), the web server layer (e.g., delays that consume other resources such as memory and central processing unit (CPU)), and the database server itself (e.g., it has to field a sudden in-rush of database clients and their authentication processes). If this cycle continually repeats itself over a short timescale the system can be considered to be "flapping."

Conventional techniques detect flapping in a computer system by making boolean determinations of whether the computer system is in a good state or a bad state (e.g., "is the service up or down?" or "is CPU usage below 50 percent or above 50 percent?") and determining whether the number of state changes between the good state and the bad state within a time window of a predefined length exceeds a predetermined threshold value. However, this approach has several drawbacks. A drawback of this approach is that it requires manually setting a threshold value for what is considered a good state and a bad state and also manually setting the length of the time window, both of which are usually guesses and/or default values. Another drawback of this approach is that it does not account for how long the computer system has been flapping. Another drawback of this approach is that it does not account for how normal changes in state might be. Another drawback of this approach is that it does not detect when there are fluctuations below the predetermined threshold value, which might be indicative of a pre-failure problem.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
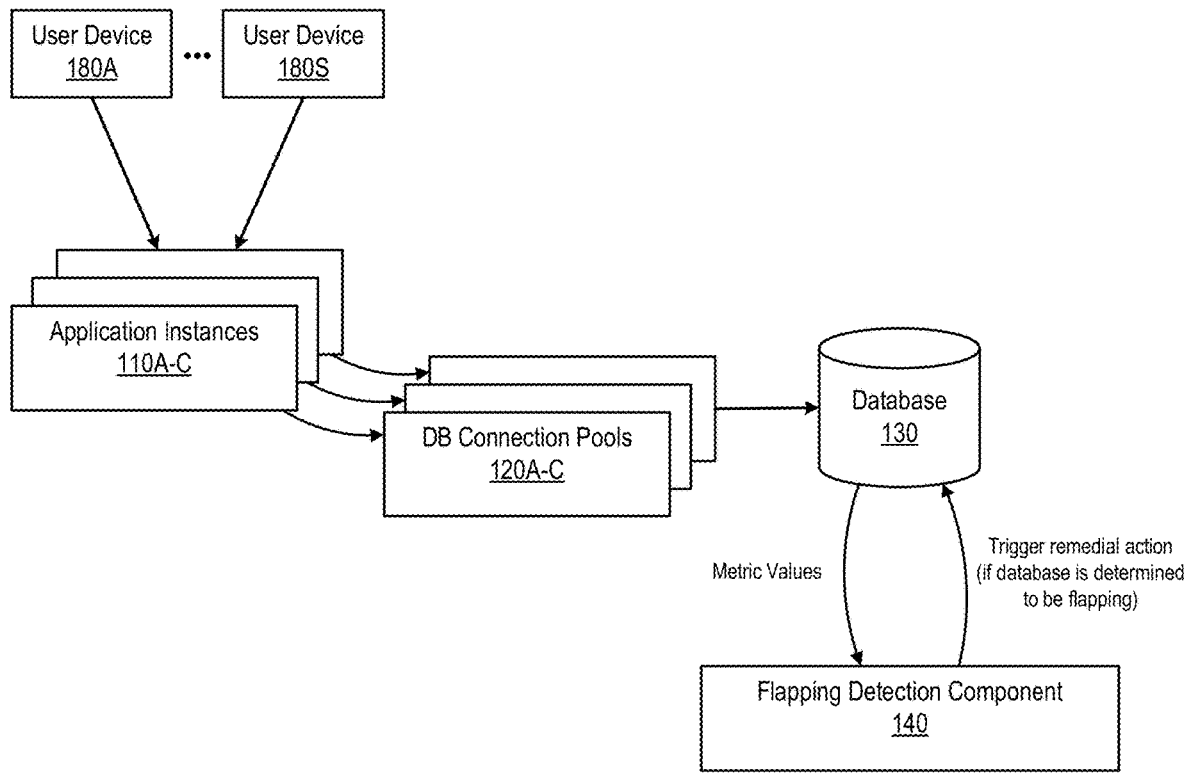
FIG. 1 is a diagram of an environment that includes a flapping detection component configured to detect flapping in a database, according to some example implementations.

The following description describes implementations for detecting flapping in a computer system. Flapping refers to the rapid fluctuation of metric values of a computer system over time that is indicative of a potential problem in the computer system. Flapping is a problem in computer systems that can have negative effects on the performance of the computer system itself as well as the performance of neighboring computer systems. Thus, there is a need to be able to detect when a computer system is flapping.

As mentioned above, conventional techniques detect flapping in a computer system by making boolean determinations of whether the computer system is in a good state or a bad state (e.g., "is the service up or down?" or "is CPU usage below 50 percent or above 50 percent?") and determining whether the number of state changes between the good state and the bad state within a time window of a predefined length exceeds a predetermined threshold value. However, this approach has several drawbacks. A drawback of this approach is that it requires manually setting a threshold value for what is considered a good state and a bad state and also manually setting the length of the time window, both of which are usually guesses and/or default values. Another drawback of this approach is that it does not account for how long the computer system has been flapping. Another drawback of this approach is that it does not account for how normal changes in state might be. Another drawback of this approach is that it does not detect when there are fluctuations below the predetermined threshold value, which might be indicative of a pre-failure problem.

Implementations are described herein that are able to detect flapping in a computer system without using a static threshold value of what is considered a good state or bad state. In an implementation, a flapping detection component obtains metric values indicating a state of the computer system at various times within a time window. For example, if the computer system implements a database, the metric values may indicate the number of database connections managed by the database at various times within the time window. The flapping detection component may then determine a combined length of lines connecting time-wise consecutive points representing the metric values in a cartesian coordinate system, wherein a first axis of the cartesian coordinate system represents time and a second axis of the cartesian coordinate system represents a metric associated with the plurality of metric values. The combined length of lines may be used as an indicator for the level of instability or "flapping" in the computer system with regard to the monitored metric. The combined length is expected to be longer if the computer system is flapping (e.g., due to more frequent and/or larger fluctuations of the metric values) and shorter if the computer system is not flapping (e.g., due to more stable metric values). The flapping detection component may then determine a baseline length based on a maximum metric value within the time window, a minimum metric value within the time window, and a length of the time window. The flapping detection component may then determine whether the computer system flapped during the time window based on a result of comparing the combined length to the baseline length. For example, the flapping detection component may determine that the computer system flapped during the time window if the combined length is longer than the baseline length. In an implementation, the flapping detection component applies this flapping determination mechanism to a sliding/moving time window (e.g., to multiple time windows that overlap in time) and stores timestamps associated with the time windows during which the computer system was determined to be flapping. The flapping detection component may then use the timestamps to determine how long the computer system has been flapping. In an implementation, the flapping detection component triggers a remedial action to be performed on the computer system if it determines that the computer system has been flapping for longer than a threshold length of time. For example, if the computer system implements a database, the remedial action may include one or more of generating an alert (e.g., to alert a database administrator), killing long-running database queries, restarting the database, and signaling database clients or application users to back off.

Implementations described herein provide one or more technological advantages. An advantage of implementations described herein is that they are able to detect flapping in a computer system without using a static threshold value of what is considered a good state or a bad state. Another advantage of implementations described herein is that they are able to determine how long a computer system has been flapping. Another advantage of implementations described herein is that they are able to account for normal changes to the state of a computer system (e.g., they allow for a gentle ebb and flow of metric values but are able to detect when the metric values have more frequent and/or larger fluctuations). Another advantage of implementations described herein is that they are able to detect metric value fluctuations that occur below a threshold value (which conventional techniques are not able to detect). Another advantage of implementations described herein is that the sensitivity of flapping detection is tunable using a flap tolerance factor. Implementations may require minimal manual configuration (e.g., thresholds do not have to be determined ahead of time or set globally) and can adapt to varying degrees of "normal." While certain advantages are mentioned above, other advantages will be apparent to those skilled in the art in view of the present disclosure. Implementations will now be described with reference to the accompanying figures.

FIG. 1 is a diagram of an environment that includes a flapping detection component configured to detect flapping in a database, according to some example implementations. As shown in the figure, the environment includes user devices 180A-S, application instances 110A-C, database connection pools 120A-C, a database 130, and a flapping detection component 140. For the sake of example, implementations are primarily described for detecting flapping in a database 130, and specifically with regards to the number of database connections managed by the database 130. However, it should be understood that the flapping detection techniques described herein can be applied to other types of applications/systems. While for the sake of illustration a certain number of user devices 180 and application instances 110 are shown in the figure, it should be understood that this the environment may include different numbers of user devices 180 and/or application instances 110 than shown in the figure.

The application instances 110A-C may be instances of an application that provides a service to users (not shown) operating the user devices 180A-S. In an implementation, the application is a web application that provides a web service to the users operating the user devices 180A-S and the application instances 110A-C are instances of the web application. In such an implementation, the user devices 180A-C may execute web application clients (e.g., web browsers or mobile apps) that the users operating the user devices 180A-S can use to access the web service provided by the web application.

The application instances 110A-C may access the database 130 (e.g., to store data and/or retrieve data) as part of providing the service. The database 130 may store various information related to the application and the users of the application that are needed by the application to provide the service. Each of the application instances 110A-C may maintain a pool 120 of database connections that it can use to access the database 130. A database connection pool is a cache of database connections that can be used to access a database. Database connection pools are typically used to enhance the performance of accessing a database since creating new database connections takes time and consumes valuable (and often scarce) computing resources. With database connection pooling, after a database connection is created, it may be placed in the pool and used again later so that a new database connection does not have to be created. If all of the database connections in the database connection pool are being used, a new database connection may be created and added to the database connection pool. Database connections may also be released from the database connection pool if it is no longer needed. Thus, the number of database connections in the database connection pool may change over time.

In the example shown in the figure, application instance 110A maintains database connection pool 120A, application instance 110B maintains database connection pool 120B, and application instance 110C maintains database connection pool 120C. In one configuration, each application instance 110 always maintains at least a minimum number of database connections in its database connection pool 120 (e.g., 5 database connections minimum) but may not have more than a maximum number of database connections in its database connection pool 120 (e.g., 50 database connections maximum) to prevent resource exhaustion. During normal/low periods of workload, the application instances 110 will tend to maintain the minimum number of database connections in their database connection pools 120 so the database 130 will only have to manage a relatively small number of database connections (e.g., if there are 100 application instances and each of them maintains five database connections in its database connection pool 120, then the database will have to manage a total of 500 database connections). However, when the database 130 slows down and/or the workload of the database 130 increases (e.g., because application instances 110 start submitting longer-running queries to the database 130, tying up database connections longer) the application instances 110 may add more database connections to their database connection pools 120 to keep up with demand.

Database connection management can be expensive in terms of the usage of computing resources. This is because each new database connection that is created requires executing another thread, requires creating another Transmission Control Protocol (TCP) connection to be created, adds context switching overhead, and/or requires establishing an encryption session to verify client authentication. Thus, as the number of database connections increase in response to a resource constraint, other resources may be further constrained.

Under pressure, application instances 110 may quickly demand more database connections (e.g., according to Little's Law, occupancy is the factor of arrival rate and processing time or latency). For example, due to increased demand, each of the application instances 110 may increase the number of database connections in its database connection pool 120 to the maximum allowed number so now the database 130 will have to manage a large number of database connections (e.g., if there are 100 application instances and each of them increases the number of database connections in its database connection pools to the maximum allowed number of 50, then the database 130 will have to manage a total of 5,000 database connections). This problem may be even more pronounced in auto-scaling systems that automatically scale the number of application instances 110 in response to demand or request latency. Each new application instance 110 that is added requires creating at least a minimum number of new database connections for that application instance's database connection pool (e.g., at least 5 new database connections), which may be even worse than an existing application instance 110 creating one or two additional database connections. When the resource constraint clears, the application instances 110 may release database connections in their database connection pools to reach the minimum number to save resources, often on equally short timescales. As a result, the number of database connections managed by the database 130 might fluctuate between a relatively low number (e.g., around 500 database connections) and a relatively high number (e.g., around 10,000) on a very short timescale, which will negatively impact the performance of the database 130 and/or the application. For example, such flapping may lead to increased number of application instances (thereby consuming more computing resources), increased number of database connections (thereby consuming more computing resources), worsening latency (a feedback loop here may result in more application instances and/or more database connections being created), potential timeouts, failures, or other errors. The users of the application might even consider the application to be down. Thus, there is a need to be able to detect when the database 130 is flapping.

In an implementation, the environment includes a flapping detection component 140 that is configured to detect when the database 130 is flapping. According to some implementations, the flapping detection component 140 obtains metric values indicating the state of the database 130 at various times within a time window. Each metric value may correspond to a particular time within the time window and indicate the state of the database 130 at that particular time. For example, the metric values may indicate the number of database connections managed by the database 130 at various times within the time window. For the sake of illustration, implementations are primarily described in a context where the monitored metric (the metric that is being used to determine whether the database 130 is flapping) is the number of database connections managed by the database 130. However, it should be understood that other metrics can be used. The length of the time window may be set to any suitable length (e.g., 10 minutes) depending on the implementation. In an implementation, the metric values correspond to times within the time window that follow a particular cadence (e.g., one metric value per second within the time window). In an implementation, the database 130 collects the metric values and provides them to the flapping detection component 140 (e.g., as a text stream of metric values). In another implementation, a third-party tool (e.g., a database monitoring tool monitoring the database 130) collects the metric values and provides them to the flapping detection component 140. In another implementation, the flapping detection component 140 queries the database 130 or otherwise accesses the database 130 (e.g., accesses the database logs of the database 130) to obtain the metric values.

The flapping detection component 140 may then determine a combined length of lines connecting time-wise consecutive points representing the metric values in a cartesian coordinate system, wherein a first axis of the cartesian coordinate system represents time and a second axis of the cartesian coordinate system represents the metric associated with the metric values (e.g., the number of database connections managed by the database 130). The combined length of lines may be used as an indicator for the level of instability or flapping in the database 130 with regard to the monitored metric. For example, if the monitored metric is the number of database connections managed by the database 130, the combined length will be longer if the number of database connections managed by the database 130 has frequent and large fluctuations within the time window but will be shorter if the number of database connections managed by the database 130 has little to no fluctuations within the time window.

In an implementation, the flapping detection component 140 determines the combined length of the lines using the below formula. The formula assumes that the metric values correspond to times that follow a particular cadence (e.g., one metric value per second).

$$\sum_{i=1}^{|M|} \sqrt{1 + (M[i] - M[i-1])^2}$$

In the above formula, M is the array of metric values in the time window, |M| is the number of metric values in array M (which corresponds to the length of the time window if the metric values are collected according to a particular cadence), and i is the array index.

The flapping detection component 140 may also determine a baseline length based on a maximum metric value within the time window, a minimum metric value within the time window, and a length of the time window. The baseline length represents the amount of instability or flapping that is considered acceptable. In an implementation, the flapping detection component 140 determines the baseline length using the below formula.

$$d \cdot (\max(M) - \min(M) + |M|)$$

In the above formula, max(M) is the maximum metric value in array M, min(M) is the minimum metric value in array M, |M| is the number of metric values in array M (which corresponds to the length of the time window if the metric values are collected according to a particular cadence), and d is a configurable flap tolerance factor. The flap tolerance factor can be any value that is greater than or equal to one and may be configured based on the desired level of sensitivity of flapping detection (e.g., a higher value can be used to lower the sensitivity of flapping detection and a lower value can be used to increase the sensitivity of flapping detection). In an implementation, the flap tolerance factor is set to a value between two and three. In an implementation, the flap tolerance factor is determined based on applying machine learning techniques to training sets. For example, Bayesian analysis may be applied to metric values associated with known good states and bad states to determine the appropriate value for the flap tolerance factor. It should be noted that the baseline length will always have at least a length of |M|. It should be understood that the formulas are provided by way of example and not intended to limit implementations to the use of these formulas. It should be understood that other implementations may determine the combined length and/or the baseline length differently. Various variations will be contemplated by those of ordinary skill in the art in view of the present disclosure.

The flapping detection component 140 may then determine whether the database 130 flapped during the time window based on a result of comparing the combined length to the baseline length. For example, the flapping detection component 140 may determine that the database 130 flapped during the time window if the combined length is greater than the baseline length, as shown in the below formula.

$$\sum_{i=1}^{|M|} \sqrt{1 + (M[i] - M[i-1])^2} > d \cdot (\max(M) - \min(M) + |M|)$$

In an implementation, the flapping detection component 140 applies the above-described flapping determination mechanism to a sliding time window that moves forward in time (e.g., to multiple time windows that overlap in time). For example, the flapping detection component 140 may apply the above-described flapping determination mechanism to a time window spanning times (=0 to 1=9, a time window spanning times t=1 to t=10, a time window spanning times t=2 to (=11, and so on. In an implementation, the flapping detection component 140 stores a timestamp associated with a time window in a data storage (not shown) if it determines that the database 130 flapped during that time window. In an implementation, the flapping detection component 140 deletes the timestamps stored in the data storage if it determines that the database 130 did not flap during the most recent time window (to represent a return to a normal (non-flapping) state).

In an implementation, the flapping detection component 140 uses the timestamps stored in the data storage to determine how long the database 130 has been flapping. For example, the flapping detection component 140 may determine the length of time that the database 130 has been flapping based on taking the timestamp associated with the most recent time window during which the database 130 was determined to be flapping and subtracting from it the timestamp associated with the time window during which the database 130 first started flapping. The timestamp associated with a time window may correspond to the time at the end of the time window, the time at the beginning of the time window, the time in the middle of the time window, or any other time within the time window. In an implementation, the timestamp is an epoch timestamp (e.g., current Unix epoch timestamp, where epoch is the number of seconds that have passed since 00:00:00 UTC Thursday, 1 Jan. 1970).

In an implementation, the flapping detection component 140 triggers a remedial action to be performed on the database 130 if it determines that the database 130 has been flapping for longer than a threshold length of time. The remedial action may include, for example, generating an alert (e.g., to alert a database administrator), killing long-running database queries, restarting the database 130, and/or signaling database clients (e.g., application instances 110) or application users (e.g., users operating user devices 180) to back off (e.g., by returning a Hypertext Transfer Protocol (HTTP) 429 "Too Many Requests" response status code). Since performing a remedial action on the database 130 can be disruptive, the threshold length of time can be configured based on the user tolerance of the database 130 to remain in the flapping state balanced with the cost of disrupting the database 130 to remediate it. For example, if users of the application can tolerate increased database latency for five minutes, then the threshold length of time may be set to five minutes so that no remedial action occurs until the database 130 has been determined to be flapping for at least that long. A flap duration that is shorter than the threshold length of time may be considered to be potentially recoverable without intervention.

Implementations described herein provide one or more technological advantages. An advantage of implementations described herein is that they are able to detect flapping in a computer system without using a static threshold value of what is considered a good state or a bad state. Another advantage of implementations described herein is that they are able to determine how long a computer system has been flapping. Another advantage of implementations described herein is that they are able to account for normal changes to the state of a computer system (e.g., they allow for a gentle ebb and flow of metric values but are able to detect when the metric values have more frequent and/or larger fluctuations). Another advantage of implementations described herein is that they are able to detect metric value fluctuations that occur below a threshold value (which conventional techniques are not able to detect). Another advantage of implementations described herein is that the sensitivity of flapping detection is tunable using a flap tolerance factor. Implementations may require minimal manual configuration (e.g., thresholds do not have to be determined ahead of time or set globally) and can adapt to varying degrees of "normal." Oher advantages will be apparent to those skilled in the art in view of the present disclosure.

Figure 2:
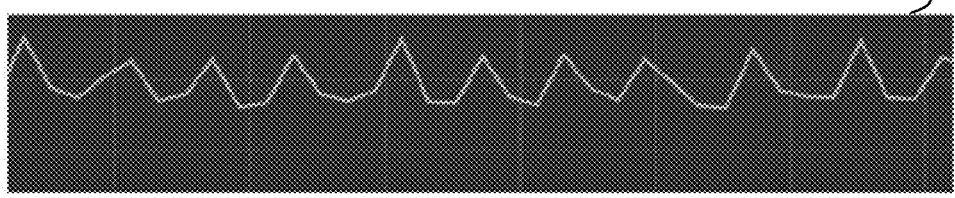
FIG. 2 is a diagram showing graphs of metric values corresponding to various conditions, according to some example implementations.
Figure 2:
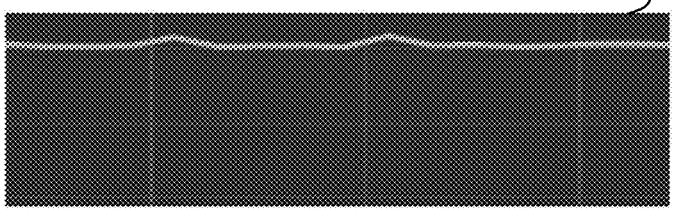
Figure 2:
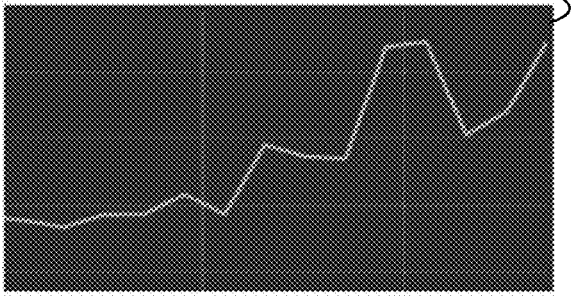
Figure 2:
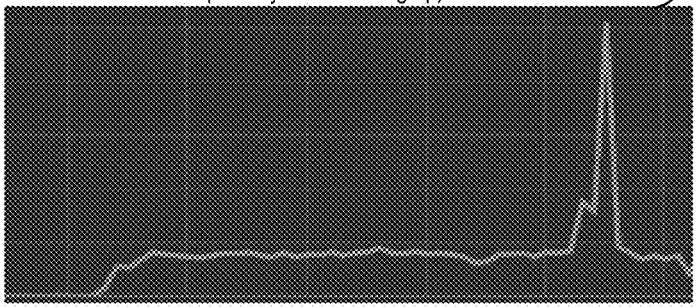
Figure 2:
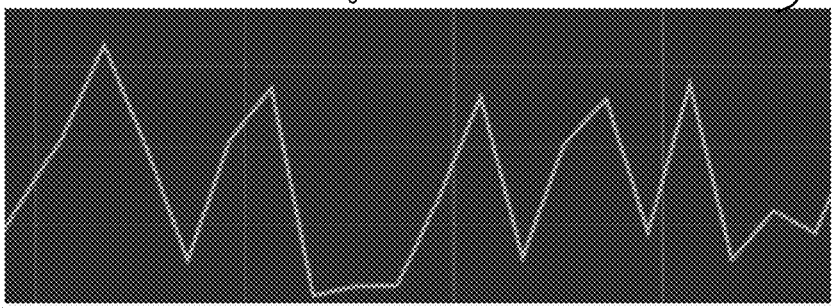

FIG. 2 is a diagram showing graphs of metric values corresponding to various conditions, according to some example implementations. The graphs show the lines connecting time-wise consecutive points representing metric values in a cartesian coordinate system. In the graphs shown in the figure, the x-axis represents time and the y-axis represents a metric (e.g., number of database connections managed by the database 130).

Graph 210 corresponds to a condition where there are frequent fluctuations in the metric values but the amplitudes of the fluctuations are small so the combined length of the lines is shorter than the baseline length. Thus, the flapping detection component 140 may determine that this is a normal (non-flapping) condition.

Graph 220 corresponds to a condition where the metric values are generally high but there is not much fluctuation so the combined length of the lines is shorter than the baseline length. Thus, the flapping detection component 140 may determine that this is a normal (non-flapping) condition.

Graph 230 corresponds to a condition where there is a trending increase in metric values over time but with little fluctuation so the combined length of the lines is shorter than the baseline length. Thus, the flapping detection component 140 may determine that this is a normal (non-flapping) condition.

Graph 240 corresponds to a condition where there is a plateau of metric values followed by a large spike (e.g., computer system is warming up). The combined length of the lines is shorter than the baseline length (the baseline length may be longer in this case due to the large difference between the maximum metric value and the minimum metric value). Thus, the flapping detection component 140 may determine that this is a normal (non-flapping) condition.

Graph 250 corresponds to a condition where there are frequent and large fluctuations in the metric values so the combined length of the lines is longer than the baseline length. Thus, the flapping detection component 140 may determine that this is an abnormal (flapping) condition.

Figure 3:
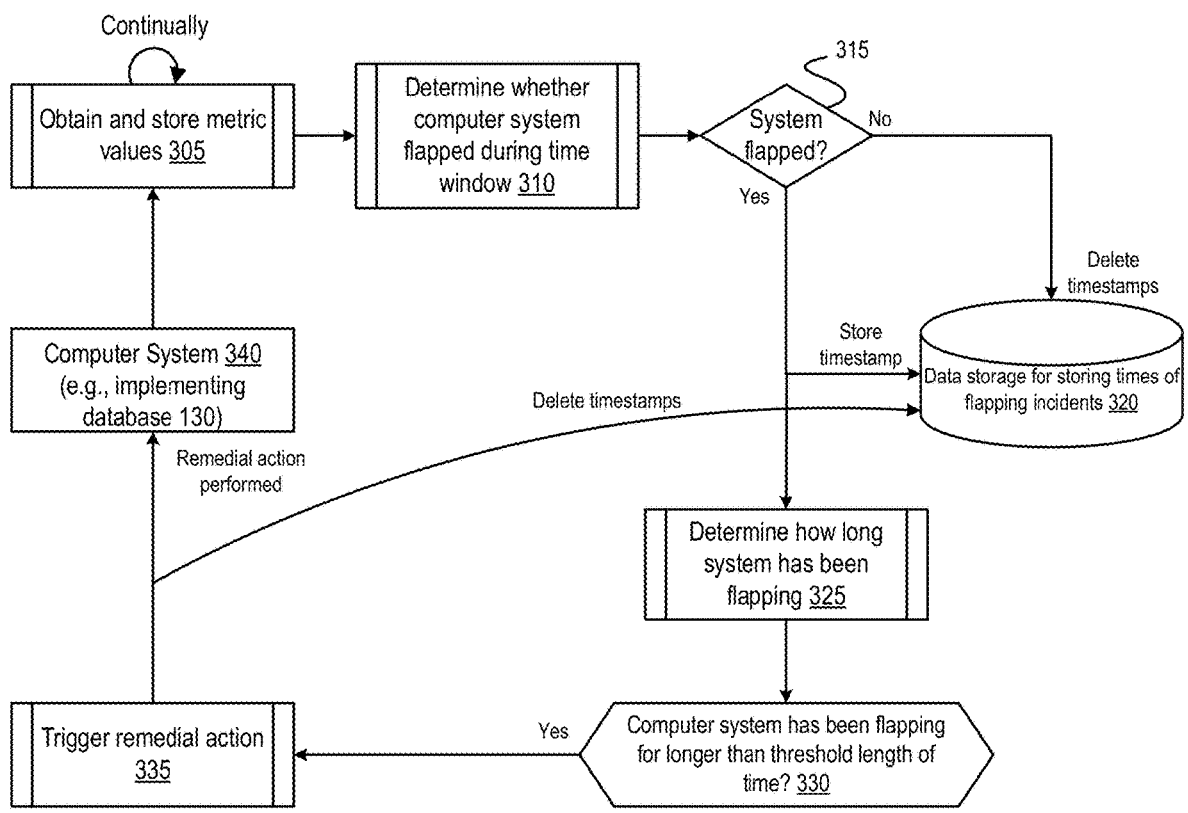
FIG. 3 is a diagram showing a flow of events for detecting flapping in a computer system, according to some example implementations.

FIG. 3 is a diagram showing a flow of events for detecting flapping in a computer system, according to some example implementations.

At block 305, the flapping detection component 140 continually obtains and stores metric values of the computer system 340 (e.g., obtains a stream of values indicating the number of database connections managed by a database 130 over time).

At block 310, the flapping detection component 140 determines whether the computer system flapped during a time window using the techniques described herein above or similar technique.

At decision block 315, if the flapping detection component 140 determines that the computer system flapped during the time window then it stores a timestamp associated with that time window in the data storage 320 and the flow of events proceeds to block 325.

At block 325, the flapping detection component 140 determines how long the computer system has been flapping. The flapping detection component 140 may determine how long the computer system 340 has been flapping based on the timestamp associated with the most recent time window during which the computer system 340 was determined to be flapping and the timestamp associated with a previous time window during which the computer system started flapping.

At decision block 330, the flapping detection component 140 determines whether the computer system 340 has been flapping for longer than a threshold length of time. If so, at block 335, the flapping detection component 140 triggers a remedial action to be performed on the computer system 340. The flapping detection component 140 may delete the timestamps stored in the data storage 320 (to represent a return to the normal/healthy (non-flapping) state, assuming the remedial action causes the computer system 340 to return to the normal/healthy state). The flow of events may then move to block 310 to make a flapping determination for the next time window. In an implementation, the flapping determination for the next time window begins before the flapping determination for the flapping determination for the current time window ends (the flapping determinations for different time windows may be performed in parallel).

Returning to decision block 330, if the flapping detection component 140 determines that the computer system 340 has not been flapping for longer than the threshold length of time, then no remedial action needs to be performed on the computer system 340. The flow may then return to block 310 to make a flapping determination for the next time window (in some implementations, the operation of block 310 may have already begun before the flapping determination for the current time window has completed to perform flapping determinations in parallel).

Returning to decision block 315, if the flapping detection component 140 determines that the computer system 340 did not flap during the time window then it may delete the timestamps stored in the data storage 320 (to represent a return to the normal/healthy (non-flapping) state) and no remedial action needs to be performed on the computer system 340. The flow of events may then proceed back to block 310 to make a flapping determination for the next time window (in some implementations, the operation of block 310 may have already begun before the flapping determination for the current time window has completed to perform flapping determinations in parallel).

Figure 4:
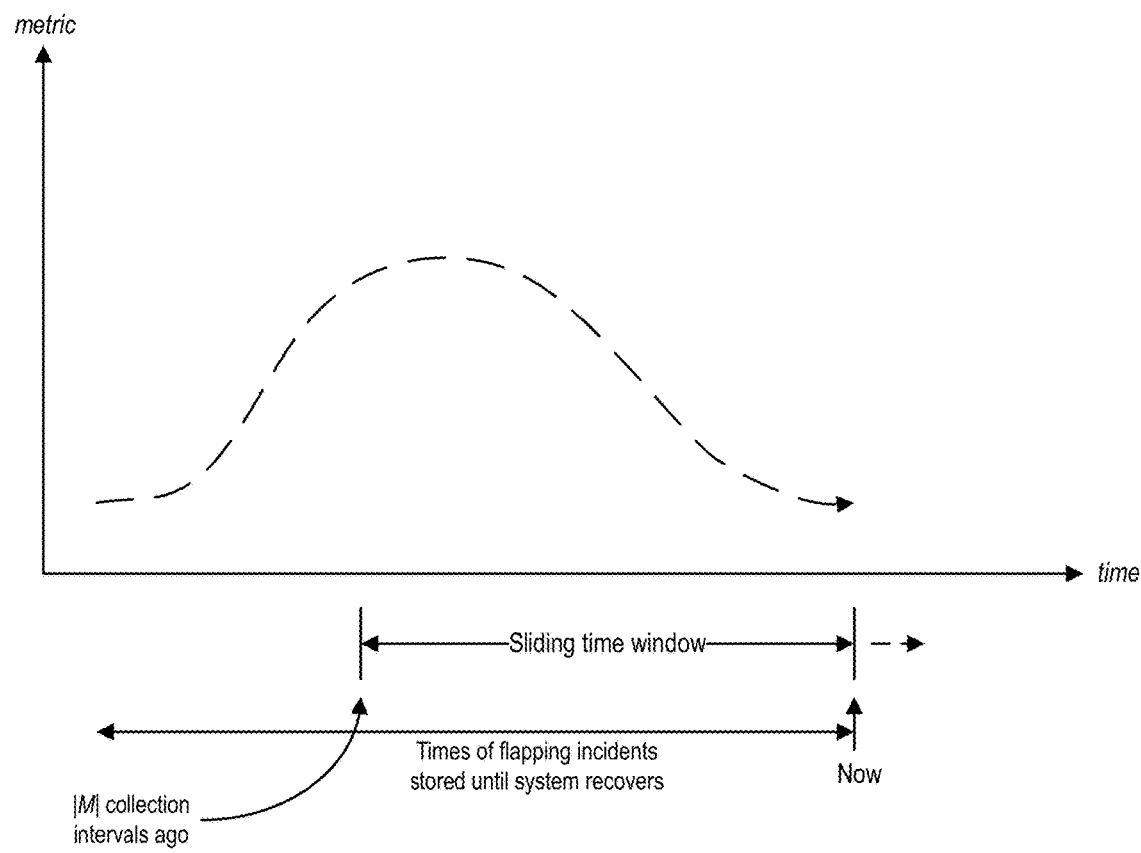
FIG. 4 is a diagram showing a sliding time window, according to some example implementations.

FIG. 4 is a diagram showing a sliding time window, according to some example implementations. The figure shows a representation of a cartesian coordinate system, where the x-axis represents time and the y-axis represents a metric. A sliding time window may "slide" or "move" forward in time in any increments of time (e.g., in increments of one second). In the example shown in the figure, the size of the sliding time window is set to IM so the beginning of the sliding time window corresponds to IM collection intervals ago. The flapping detection component 140 may determine whether a computer system flapped during each time window as the time window slides forward in time. The timestamps of flapping incidents may be stored in a data storage (e.g., data storage 320) until it is determined that the computer system recovered to a normal (non-flapping) state (e.g., until the flapping detection component 140 determines that the computer system did not flap during the most recent time window). The flapping detection component 140 may trigger a remedial action to be performed on the computer system if the flapping detection component 140 determines that the computer system has been flapping for longer than a threshold length of time.

Figure 5:
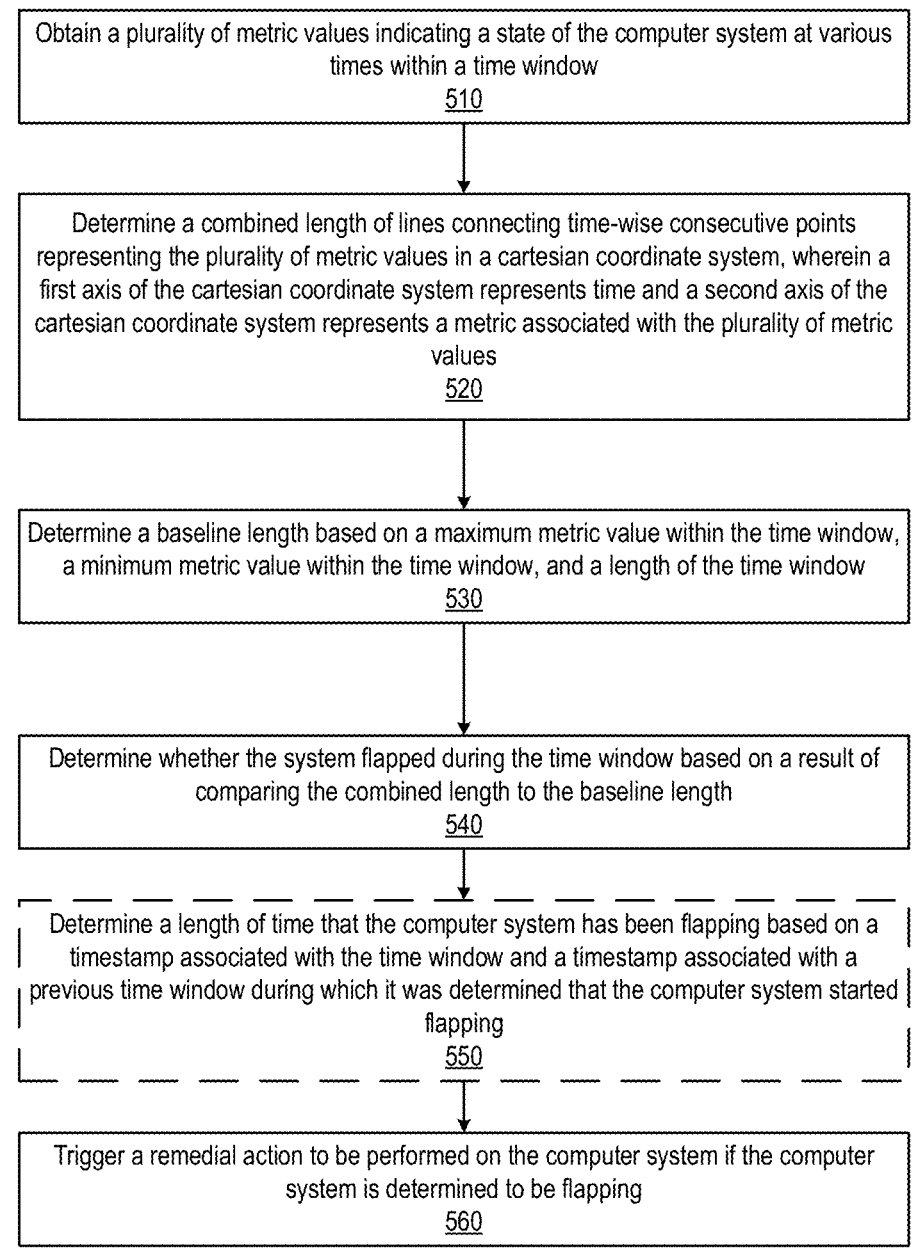
FIG. 5 is a flow diagram of a process for detecting flapping in a computer system, according to some example implementations.

FIG. 5 is a flow diagram of a process for detecting flapping in a computer system, according to some example implementations. In an implementation, the process is performed by one or more electronic devices implementing a flapping detection component 140. The process may be performed using hardware, software, firmware, or any combination thereof.

At block 510, the one or more electronic devices obtain a plurality of metric values indicating a state of the computer system at various times within a time window. In an implementation, the plurality of metric values indicates a number of database connections maintained by the computer system at various times within the time window.

At block 520, the one or more electronic devices determine a combined length of lines connecting time-wise consecutive points representing the plurality of metric values in a cartesian coordinate system, wherein a first axis of the cartesian coordinate system (e.g., x-axis) represents time and a second axis of the cartesian coordinate system (e.g., y-axis) represents a metric associated with the plurality of metric values.

At block 530, the one or more electronic devices determine a baseline length based on a maximum metric value within the time window, a minimum metric value within the time window, and a length of the time window. In an implementation, the baseline length is further determined based on a flap tolerance factor. In an implementation, the baseline length is determined based on multiplying the flap tolerance factor by a sum of a difference between the maximum metric value and the minimum metric value and a number of time intervals within the time window (e.g., according to the formula: $d \cdot (\max(M) - \min(M) + |M|)$). In an implementation, the flap tolerance factor (e.g., d) is between two and three.

At block 540, the one or more electronic devices determine whether the system flapped during the time window based on a result of comparing the combined length (or some length/value that is based on the combined length) to the baseline length. In an implementation, the one or more electronic devices store, in a data storage, a timestamp associated with the time window in response to a determination that the computer system flapped during the time window. In an implementation, the one or more electronic devices delete, from a data storage, timestamps associated with one or more previous time windows during which the computer system was determined to be flapping in response to a determination that the computer system did not flap during the time window. In an implementation, the one or more electronic devices determine whether the computer system flapped during one or more other time windows, wherein the time window and the one or more other time windows are overlapping in time (e.g., a sliding time window).

In an implementation, at block 550, the one or more electronic devices determine a length of time that the computer system has been flapping based on a timestamp associated with the time window and a timestamp associated with a previous time window during which it was determined that the computer system started flapping.

At block 560, the one or more electronic devices trigger a remedial action to be performed on the computer system if the computer system is determined to be flapping. In an implementation, the remedial action is triggered based on a determination that the length of time that the computer system has been flapping is longer than a predefined threshold. In an implementation, the computer system implements a database and the remedial action includes one or more of generating an alert (e.g., to alert an administrator), killing long-running database queries, restarting the database, and signaling database clients or application users (e.g., users operating user devices 180) to back off.

EXAMPLE ELECTRONIC DEVICES AND ENVIRONMENTS

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
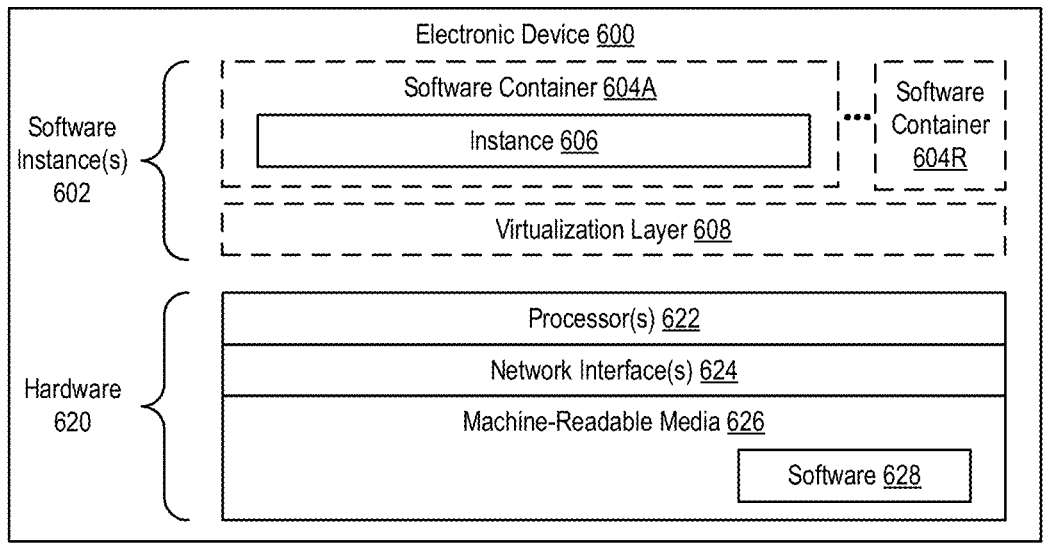
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable medium/media. The previously described flapping detection component 140 may be implemented in one or more electronic devices 600.

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
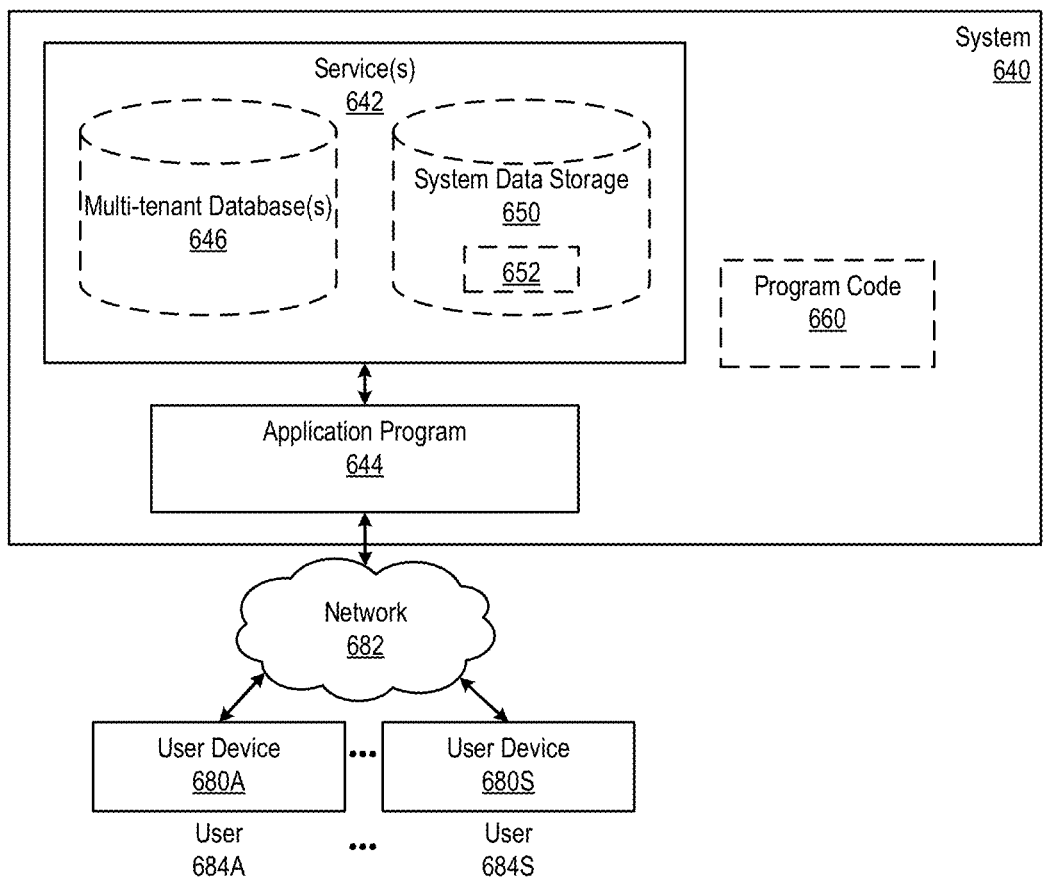
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642. In some implementations the system 640 is in one or more datacenter(s). These datacenter(s) may be:1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

In an implementation, the flapping detection component 140 described herein may be used to detect flapping in the system 640. For example, the flapping detection component 140 may be used to detect flapping in the multi-tenant database(s) 646, the system data storage 650, and/or any other component that is used to implement the service(s) 642.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method by one or more electronic devices to detect flapping in a computer system, the method comprising:
   obtaining a plurality of metric values indicating a state of the computer system at various times within a first time window from a plurality of time windows;
   determining a combined length value indicative of a combined length of lines connecting time-wise consecutive points representing the plurality of metric values in a cartesian coordinate system, wherein a first axis of the cartesian coordinate system represents time and a second axis of the cartesian coordinate system represents a metric associated with the plurality of metric values;
   determining a baseline length value based on determining a difference between a maximum metric value within the first time window and a minimum metric value within the first time window and summing the difference and a value indicative of a length of the first time window, wherein the maximum metric value within the first time window corresponds to a highest value among the plurality of metric values and the minimum metric value within the first time window corresponds to a lowest value among the plurality of metric values;
   determining whether the computer system flapped during the first time window based on a result of comparing the combined length value to the baseline length value, wherein a separate baseline length value is determined for each separate time window of the plurality of time windows based on a separate maximum metric value within the separate time window and a separate minimum metric value within the separate time window, and the separate baseline length value is applied for determining whether the computer system flapped during the separate time window; and
   triggering a remedial action to be performed on the computer system based on a determination that the computer system flapped during the first time window.

2. The method of claim 1, wherein the baseline length value is further determined based on a flap tolerance factor.

3. The method of claim 2, wherein the baseline length value is determined based on multiplying the flap tolerance factor by the sum.

4. The method of claim 3, wherein the flap tolerance factor is between two and three.

5. The method of claim 1, wherein the computer system implements a database and the remedial action includes one or more of killing long-running database queries, restarting the database, and signaling database clients to back off.

6. The method of claim 1, further comprising:
   determining a length of time that the computer system has been flapping based on a timestamp associated with the first time window and a timestamp associated with a previous time window during which it was determined that the computer system started flapping.

7. The method of claim 6, wherein the remedial action is triggered further based on a determination that the length of time that the computer system has been flapping is longer than a predefined threshold.

8. The method of claim 1, further comprising:
storing, in a data storage, a timestamp associated with the first time window in response to a determination that the computer system flapped during the first time window.

9. The method of claim 1, further comprising:
deleting, from a data storage, timestamps associated with one or more previous time windows during which the computer system was determined to be flapping in response to a determination that the computer system did not flap during the first time window.

10. The method of claim 1, further comprising:
determining whether the computer system flapped during one or more other time windows, wherein the first time window and the one or more other time windows are overlapping in time.

11. The method of claim 1, wherein the plurality of metric values indicates a number of database connections maintained by the computer system at the various times within the first time window.

12. A non-transitory machine-readable storage medium that provides instructions that, if executed by a set of one or more processors of an electronic device, are configurable to cause said electronic device to perform operations for detecting flapping in a computer system, the operations comprising:
obtaining a plurality of metric values indicating a state of the computer system at various times within a first time window from a plurality of time windows;
determining a combined length value indicative of a combined length of lines connecting time-wise consecutive points representing the plurality of metric values in a cartesian coordinate system, wherein a first axis of the cartesian coordinate system represents time and a second axis of the cartesian coordinate system represents a metric associated with the plurality of metric values;
determining a baseline length value based on determining a difference between a maximum metric value within the first time window and a minimum metric value within the first time window and summing the difference and a value indicative of a length of the first time window, wherein the maximum metric value within the first time window corresponds to a highest value among the plurality of metric values and the minimum metric value within the first time window corresponds to a lowest value among the plurality of metric values;
determining whether the computer system flapped during the first time window based on a result of comparing the combined length value to the baseline length value, wherein a separate baseline length value is determined for each separate time window of the plurality of time windows based on a separate maximum metric value within the separate time window and a separate minimum metric value within the separate time window, and the separate baseline length value is applied for determining whether the computer system flapped during the time window; and
triggering a remedial action to be performed on the computer system based on a determination that the computer system flapped during the first time window.

13. The non-transitory machine-readable storage medium of claim 12, wherein the computer system implements a database and the remedial action includes one or more of killing long-running database queries, restarting the database, and signaling database clients to back off.

14. The non-transitory machine-readable storage medium of claim 12, wherein the plurality of metric values indicates a number of database connections maintained by the computer system at the various times within the first time window.

15. An apparatus to detect flapping in a computer system, the apparatus comprising:
a set of one or more processors; and
a non-transitory machine-readable storage medium that provides instructions that, if executed by the set of one or more processors, are configurable to cause the apparatus to perform operations comprising:
obtaining a plurality of metric values indicating a state of the computer system at various times within a first time window from a plurality of time windows,
determining a combined length value indicative of a combined length of lines connecting time-wise consecutive points representing the plurality of metric values in a cartesian coordinate system, wherein a first axis of the cartesian coordinate system represents time and a second axis of the cartesian coordinate system represents a metric associated with the plurality of metric values,
determining a baseline length value based on determining a difference between a maximum metric value within the first time window and a minimum metric value within the first time window and summing the difference and a value indicative of a length of the first time window, wherein the maximum metric value within the first time window corresponds to a highest value among the plurality of metric values and the minimum metric value within the first time window corresponds to a lowest value among the plurality of metric values,
determining whether the computer system flapped during the first time window based on a result of comparing the combined length value to the baseline length value, wherein a separate baseline length value is determined for each separate time window of the plurality of time windows based on a separate maximum metric value within the separate time window and a separate minimum metric value within the separate time window, and the separate baseline length value is applied for determining whether the computer system flapped during the separate time window, and
triggering a remedial action to be performed on the computer system based on a determination that the computer system flapped during the first time window.

16. The apparatus of claim 15, wherein the computer system implements a database and the remedial action includes one or more of killing long-running database queries, restarting the database, and signaling database clients to back off.

17. The apparatus of claim 15, wherein the plurality of metric values indicates a number of database connections maintained by the computer system at the various times within the first time window.

* * * * *